United States Patent
Urano et al.

(10) Patent No.: US 11,808,736 B2
(45) Date of Patent: Nov. 7, 2023

(54) FIXING FORCE EVALUATION METHOD

(71) Applicant: TOYOTA JIDOSHA KABUSHIKI KAISHA, Toyota (JP)

(72) Inventors: Hiroaki Urano, Miyoshi (JP); Akihide Shimmei, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 17/365,743

(22) Filed: Jul. 1, 2021

(65) Prior Publication Data

US 2022/0018813 A1    Jan. 20, 2022

(30) Foreign Application Priority Data

Jul. 16, 2020   (JP) ................. 2020-122438

(51) Int. Cl.
*G01N 29/12*    (2006.01)
*G01M 7/08*    (2006.01)
*G01N 29/46*    (2006.01)
*G01H 13/00*    (2006.01)
*G01M 7/02*    (2006.01)
*H02K 3/34*    (2006.01)
*G01N 29/04*    (2006.01)

(52) U.S. Cl.
CPC ............ *G01N 29/12* (2013.01); *G01H 13/00* (2013.01); *G01M 7/02* (2013.01); *G01M 7/08* (2013.01); *G01N 29/045* (2013.01); *G01N 29/46* (2013.01); *G01N 2291/02827* (2013.01); *G01N 2291/2693* (2013.01); *H02K 3/345* (2013.01)

(58) Field of Classification Search
CPC ............. G01N 29/12; G01N 29/045; G01N 2291/02827; G01N 2291/2693; G01N 29/46; G01H 13/00; G01M 7/08; G01M 7/02; H02K 3/345
USPC .................................................. 73/582, 579
See application file for complete search history.

(56) References Cited

FOREIGN PATENT DOCUMENTS

| JP | H08226866 | A | * | 9/1996 |
| JP | 2004177136 | A | * | 6/2004 |
| JP | 2018-107921 | A |   | 7/2018 |
| JP | 2020094938 | A | * | 6/2020 |
| JP | 2022047436 | A | * | 3/2022 |

* cited by examiner

*Primary Examiner* — Lisa M Caputo
*Assistant Examiner* — Rose M Miller
(74) *Attorney, Agent, or Firm* — Oliff PLC

(57) ABSTRACT

The fixing force evaluation method of the present embodiment includes the natural frequency measurement step of measuring the natural frequency of the stator in which the tooth portions and the stator coil are fixed by the insulating paper, and the fixing force evaluation step of evaluating that the fixing force of the insulating paper is larger, when the natural frequency of the stator measured in the natural frequency measurement step is equal to more than a predetermined determination frequency, compared to when the natural frequency is lower than the determination frequency. Thus, since the fixing force of the insulating paper is evaluated in the fixing force evaluation step based on the natural frequency of the stator measured in the natural frequency measurement step, the fixing force of the insulating paper can be evaluated by measuring the natural frequency of the stator without destroying the stator.

3 Claims, 4 Drawing Sheets

FIXING FORCE EVALUATION METHOD

CROSS-REFERENCE TO RELATED APPLICATION

This application claims priority to Japanese Patent Application No. 2020-122438 filed on Jul. 16, 2020, incorporated herein by reference in its entirety.

BACKGROUND

1. Technical Field

The present disclosure relates to a fixing force evaluation method for evaluating a fixing force of an insulating paper that fixes a tooth portion formed on a stator core and a coil wound around the tooth portion, and relates to a technique for evaluating the fixing force of the insulating paper without braking a stator in which the tooth portion and the coil are fixed by the insulating paper.

2. Description of Related Art

A stator of a rotary electric machine that includes (a) a tooth portion provided on a stator core, (b) a coil wound around the tooth portion, and (c) an insulating paper having a foam adhesive layer on both sides of a base material and interposed between the tooth portion and the coil, and (d) in which the tooth portion and the coil are fixed by the insulating paper by heating the foam adhesive layer. For example, such a stator is a stator of a rotary electric machine described in Japanese Unexamined Patent Application Publication No. 2018-107921 (JP 2018-107921 A).

SUMMARY

By the way, in a stator of a rotary electric machine such as in JP 2018-107921 A, when evaluating a fixing force of an insulating paper that fixes a tooth portion and a coil, for example, as a method of the evaluation, measuring the fixing force of the insulating paper by cutting the stator in a direction orthogonal to the center axis and pressing each one of the coils of the stator exposed from the cutting surface until the coil portion comes off the tooth portion is considered. However, such a method has a problem that the stator is destroyed in order to evaluate the fixing force of the insulating paper.

The present disclosure has been made against the background of the above circumstances, and an object of the present disclosure is to provide a fixing force evaluation method for evaluating a fixing force of an insulating paper without breaking a stator.

As a result of various studies, the present inventor has reached the following facts. That is, it was found out that when the hardness of the foam adhesive layer that fixes the tooth portion and the coil, which is the fixing force of the insulating paper, changes, the rigidity of the entire stator changes and the natural frequency of the stator changes. That is, it was found that the fixing force of the insulating paper is larger when the natural frequency of the stator is high, more than when the natural frequency is low. Then, it is conceived that it is possible to estimate the fixing force of the insulating paper by measuring the natural frequency of the stator. The present disclosure has been tried based on such findings.

A summary of a first aspect is as follows, (a) the first aspect is a fixing force evaluation method for evaluating a fixing force of an insulating paper that has a foam adhesive layer on both sides, that is interposed between a tooth portion provided on a stator core and a coil wound around the tooth portion, and that fixes the tooth portion and the coil, the fixing force evaluation method including: (b) a natural frequency measurement step of measuring a natural frequency of a stator in which the tooth portion and the coil are fixed by the insulating paper; and (c) a fixing force evaluation step of evaluating that the fixing force of the insulating paper is large when the natural frequency of the stator measured in the natural frequency measurement step is high, compared to when the natural frequency is low.

A summary of a fixing force evaluation method of the second aspect is that in the first aspect, in the fixing force evaluation step, it is estimated that the fixing force of the insulating paper satisfies a predetermined reference value when the natural frequency measured in the natural frequency measurement step is equal to or more than a predetermined determination frequency.

A summary of a third aspect is that, in the first aspect or the second aspect, in the natural frequency measurement step, frequency analysis is performed on a signal that is detected by an acceleration sensor provided at a predetermined second spot of the stator by exciting a predetermined first spot of the stator with a hammer, and the frequency in which a sound pressure level establishes the highest peak is set as the natural frequency of the stator.

Further, a summary of a fourth aspect is that, in any one aspect of the first aspect to the third aspect, (a) the foam adhesive layer expands by being heated and then hardens, and (b) the harder a hardness of the cured foam adhesive layer is, the higher the natural frequency measured in the natural frequency measurement step is.

The fixing force evaluation method of the first aspect includes (b) a natural frequency measurement step of measuring a natural frequency of a stator in which the tooth portion and the coil are fixed by the insulating paper, and (c) a fixing force evaluation step of evaluating that the fixing force of the insulating paper is large compared to when the natural frequency is low, when the natural frequency of the stator measured in the natural frequency measurement step is high. Thus, since the fixing force of the insulating paper is evaluated in the fixing force evaluation step based on the natural frequency of the stator measured in the natural frequency measurement step, the fixing force of the insulating paper can be evaluated by measuring the natural frequency of the stator without destroying the stator.

According to a fixing force evaluation method of the second aspect, in the fixing force evaluation step, it is estimated that the fixing force of the insulating paper satisfies a predetermined reference value when the natural frequency measured in the natural frequency measurement step is equal to or more than a predetermined determination frequency. Therefore, it is possible to estimate whether the fixing force of the insulating paper satisfies the reference value by measuring the natural frequency of the stator without destroying the stator.

According to a fixing force evaluation method of a third aspect, in the natural frequency measurement step, frequency analysis is performed on a signal that is detected by an acceleration sensor provided at a predetermined second spot of the stator by exciting the predetermined first spot of the stator with the hammer, and the frequency in which the sound pressure level establishes the highest peak is set as natural frequency of the stator. Therefore, the natural frequency of the stator can be suitably measured in the natural frequency measurement step.

Further, according to a fixing force evaluation method of a fourth aspect, (a) the foam adhesive layer expands by being heated and then hardens, and (b) the harder the hardness of the cured foam adhesive layer is, the higher the natural frequency measured in the natural frequency measurement step is. Thus, the hardness of the cured foam adhesive layer can be evaluated by measuring the natural frequency of the stator without destroying the stator.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 7 is a diagram showing a relationship between the fixing force of the insulating paper and a natural frequency of the stator in stators that are manufactured so as to each have a different fixing force of the insulating paper by changing a thickness of the foam adhesive layer and the like.

DETAILED DESCRIPTION OF EMBODIMENTS

Hereinafter, a first embodiment of the present disclosure will be described in detail with reference to the drawings. Note that, in the following embodiment, the drawings are appropriately simplified or modified, and the dimensional ratios and shapes of the respective parts are not necessarily drawn accurately.

Figure 1:
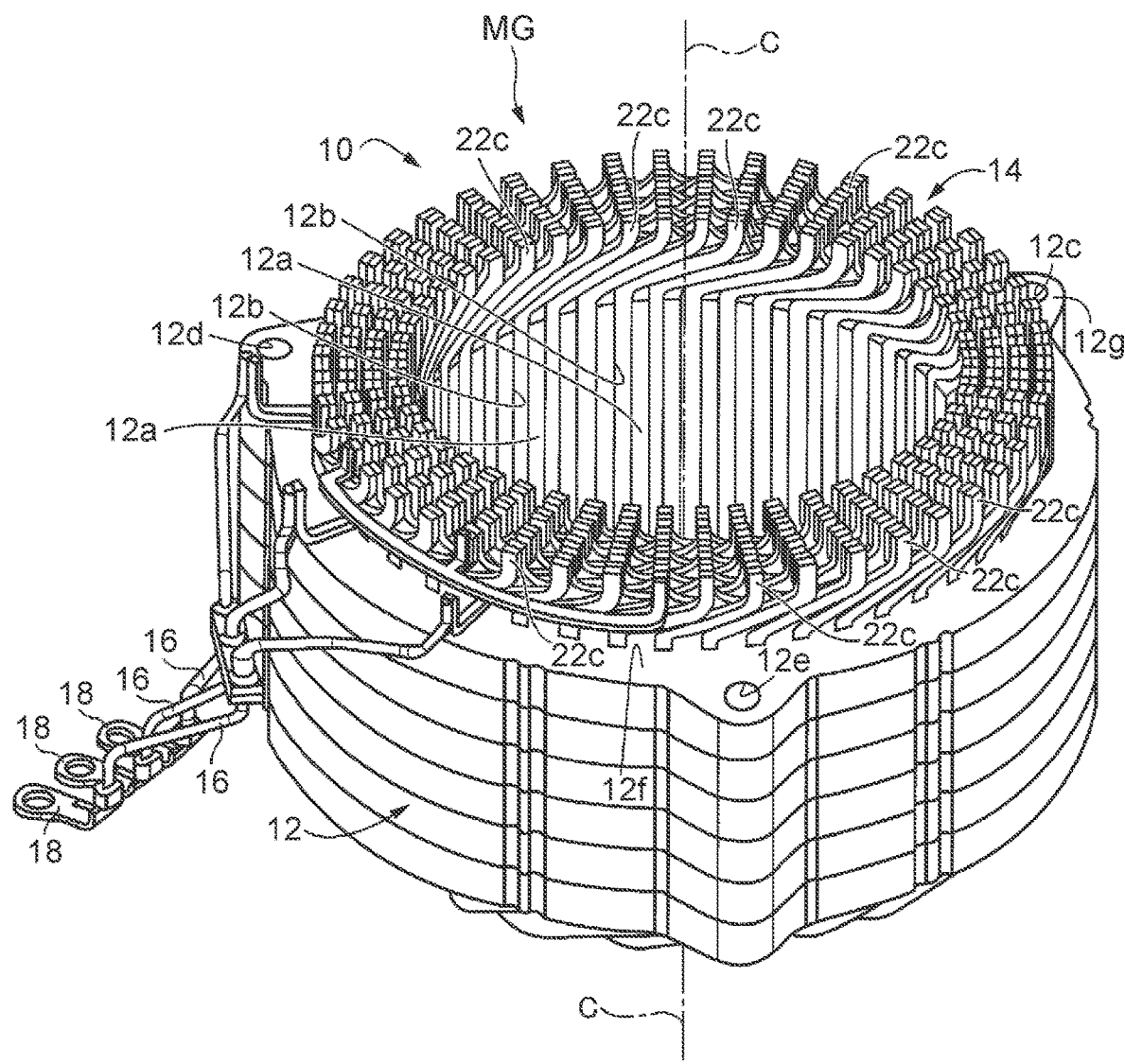
FIG. 1 is a perspective view describing a schematic configuration of a stator of a vehicle rotary electric machine to which the present disclosure is preferably applied.

FIG. 1 is a perspective view describing a schematic configuration of a stator 10 of a vehicle rotary electric machine MG to which the present disclosure is preferably applied. The vehicle rotary electric machine MG is a so-called motor generator having a function as an electric motor (motor) and a function as a generator (generator) mounted on a hybrid vehicle or an electric vehicle, for example. Further, the vehicle rotary electric machine MG is a drive source for traveling of a vehicle, for example. The vehicle rotary electric machine MG includes the cylindrical stator 10 centered on a rotation axis C of the rotor, which will be described later, and a rotor (not shown) arranged on an inner peripheral side of the stator 10. The rotor is rotated by a rotating magnetic field generated from the stator 10.

As shown in FIG. 1, the stator 10 includes a stator core 12, a stator coil (coil) 14, and a power line 16. In the stator core 12, a plurality of electromagnetic steel plates are stacked and extend in a cylindrical shape about the rotation axis C. Further, in the stator core 12, a plurality of tooth portions 12a protruding from an inner peripheral surface of the cylindrical stator core 12 toward the inner peripheral side is formed. As shown in FIG. 1, a slot 12b that is a groove-shaped space is formed between the tooth portions 12a adjacent to each other in the circumferential direction of the stator core 12. The stator coil 14 is wound around the tooth portion 12a.

The stator coil 14 is, for example, a three-phase winding of a U-phase, V-phase, and W-phase, and an end portion of each stator coil 14 is electrically connected to the power line 16. An external terminal 18 for connecting to an inverter or the like (not shown) is attached to each tip end portion of the power line 16.

Figure 2:
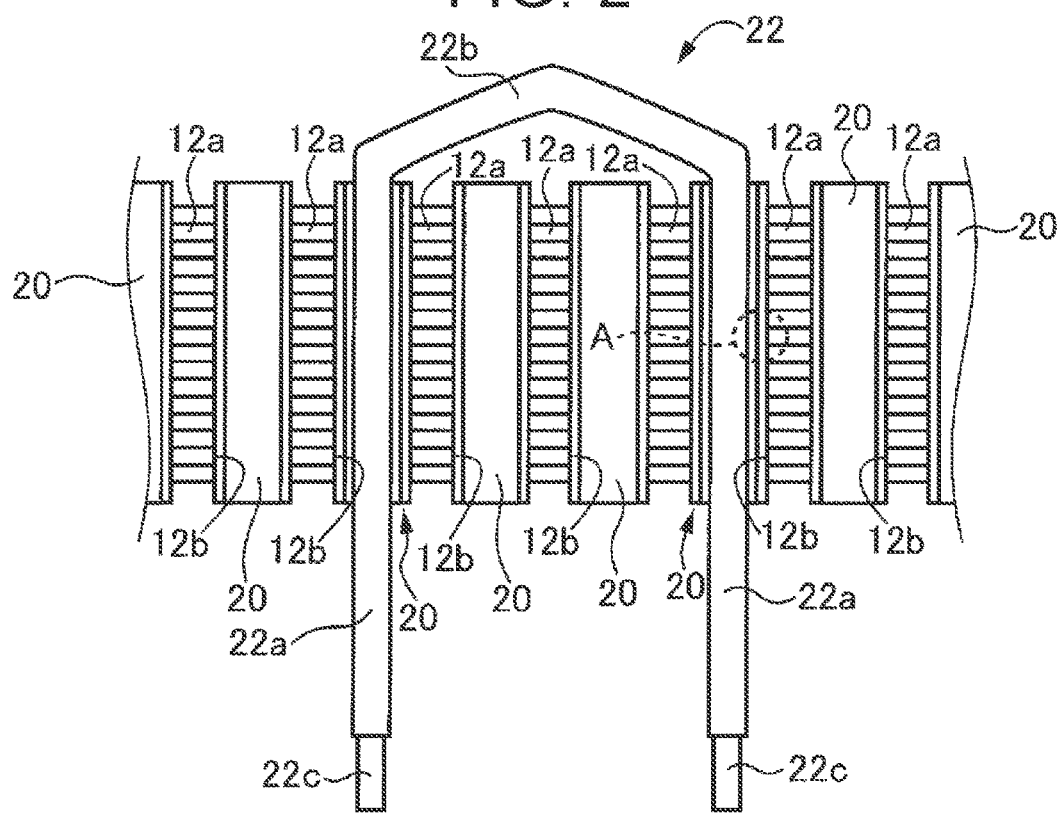
FIG. 2 is a view in which an insulating paper is arranged in a slot formed in a stator core and a coil segment is inserted in the slot, and is a view of an outer peripheral side of the stator core seen from an inner peripheral side of the stator core.

FIG. 2 is a view in which an insulating paper 20 is arranged in the slot 12b formed in the stator core 12, and a coil segment 22 is inserted in the slot 12b. FIG. 2 is a view of an outer peripheral side of the stator core 12 seen from an inner peripheral side of the stator core 12. As shown in FIG. 2, the coil segment 22 is bent into a substantially U shape, and the coil segment 22 connects a pair of arm portions 22a extending linearly and a coupling portion 22b that couples end portions of the pair of arm portions 22a to each other. The coil segment 22 is a rectangular wire having a rectangular cross section, such as a longitudinal conductor plate, in which an insulating film such as enamel is formed on a surface of the rectangular wire. Further, the insulating film is removed from each of the tip end portions 22c of the pair of arm portions 22a. As shown in FIG. 1, the tip end portions 22c of the pair of arm portions 22a of the coil segment 22 protruding from the slot 12b are each bent so that the tip end portions 22c are separated from each other in the circumferential direction of the stator core 12, and are connected to the tip end portions 22c of the arm portions 22a of another coil segment 22 by welding, for example. That is, the stator coil 14 wound around the tooth portion 12a is formed by connecting a plurality of the coil segments 22 as shown in FIG. 1.

Figure 3A:
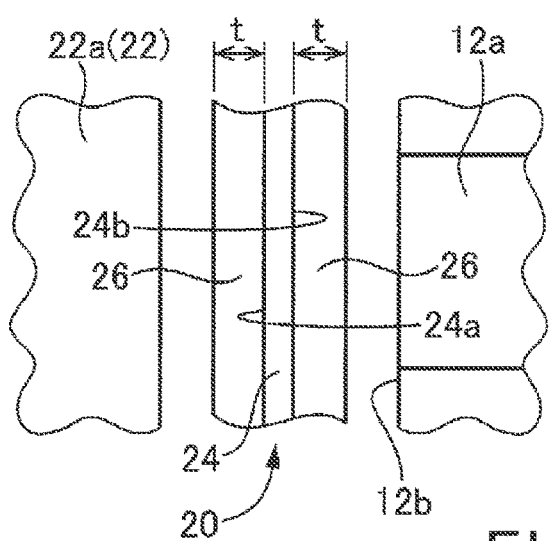
FIG. 3A is an enlarged view in which a part surrounded by a broken line in FIG. 2 is enlarged in order to describe a configuration of the insulating paper interposed between the tooth portion and the coil segment.
Figure 3B:
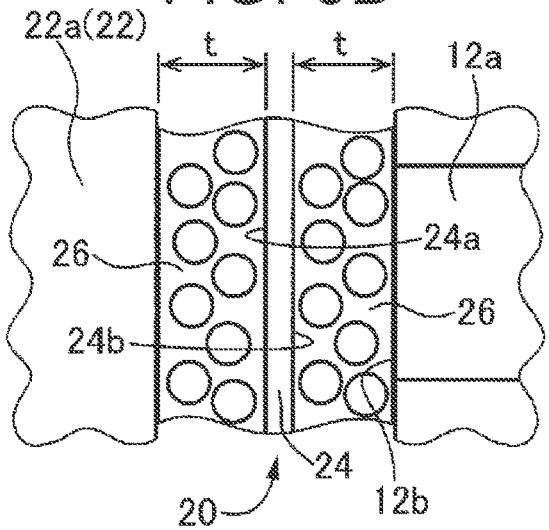
FIG. 3B is an enlarged view showing a state in which a foam adhesive layer is foamed and expanded due to the insulating paper shown in FIG. 3A being heated.

As shown in FIG. 2, the insulating paper 20 is interposed between the tooth portion 12a and the coil segment 22 in order to insulate the tooth portion 12a and the coil segment 22, that is, the stator coil 14, and is a sheet that is folded so as to match the shape of the slot 12b. As shown in FIG. 3A, the insulating paper 20 is an insulating paper having a foam adhesive layer 26 on both sides 24a, 24b of a base material 24. The base material 24 is made by molding a resin material having heat resistance and insulating properties into a sheet shape. The resin material used for the base material 24 is, for example, polyethylene naphthalate (PEN). Further, the foam adhesive layer 26 is a layer of a thermosetting resin that foams and expands by being heated and is then cured, and the foam adhesive layer 26 itself has adhesive properties. As shown in FIG. 3B, the foam adhesive layer 26 foams and expands by a predetermined heating. For example, a thickness t of the foam adhesive layer 26 becomes thicker by a several number of times of an initial state shown in FIG. 3A. The foam adhesive layer 26 is, for example, a layer of a thermosetting resin in which resin beads (grains) containing a foaming agent are contained in an epoxy-based thermosetting resin, and when the foam adhesive layer 26 is heated, the foam adhesive layer 26 expands due to the expansion of the resin beads. FIG. 3A is an enlarged view in which a part surrounded by a broken line in FIG. 2 is enlarged in order to describe a configuration of the insulating paper 20 interposed between the tooth portion 12a and the coil segment 22, and FIG. 3B is an enlarged view showing a state in which the foam adhesive layer 26 is foamed and expanded due to the insulating paper 20 shown in FIG. 3A being heated.

In the stator 10 configured as described above, when the foam adhesive layer 26 of the insulating paper 20 is heated, the foam adhesive layer 26 expands and then is cured as shown in FIG. 3B, and the tooth portion 12a of the stator core 12 and the stator coil 14 are fixed by the insulating paper 20.

Figure 4:
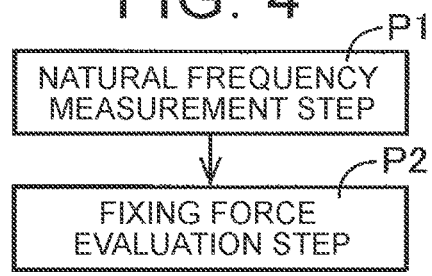
FIG. 4 is a process diagram describing a main part of a fixing force evaluation method for evaluating a fixing force of the insulating paper that fixes the tooth portion and a stator coil in the stator.

From here, the fixing force evaluation method for evaluating a fixing force FS [N] of the insulating paper 20 described above that fixes the tooth portion 12a and the stator coil 14 will be described in detail. As shown in FIG. 4, the fixing force evaluation method includes a natural frequency measurement step P1 and a fixing force evaluation step P2. This fixing force evaluation method is used, for example, in a sampling inspection in which the predetermined stator 10 is sampled from a plurality of manufactured stators 10 and the fixing force FS of the insulating paper 20 of the sample is inspected. Further, FIG. 4 is a process diagram illustrating a main part of the fixing force evaluation method for evaluating the fixing force FS of the insulating paper 20.

Figure 5:
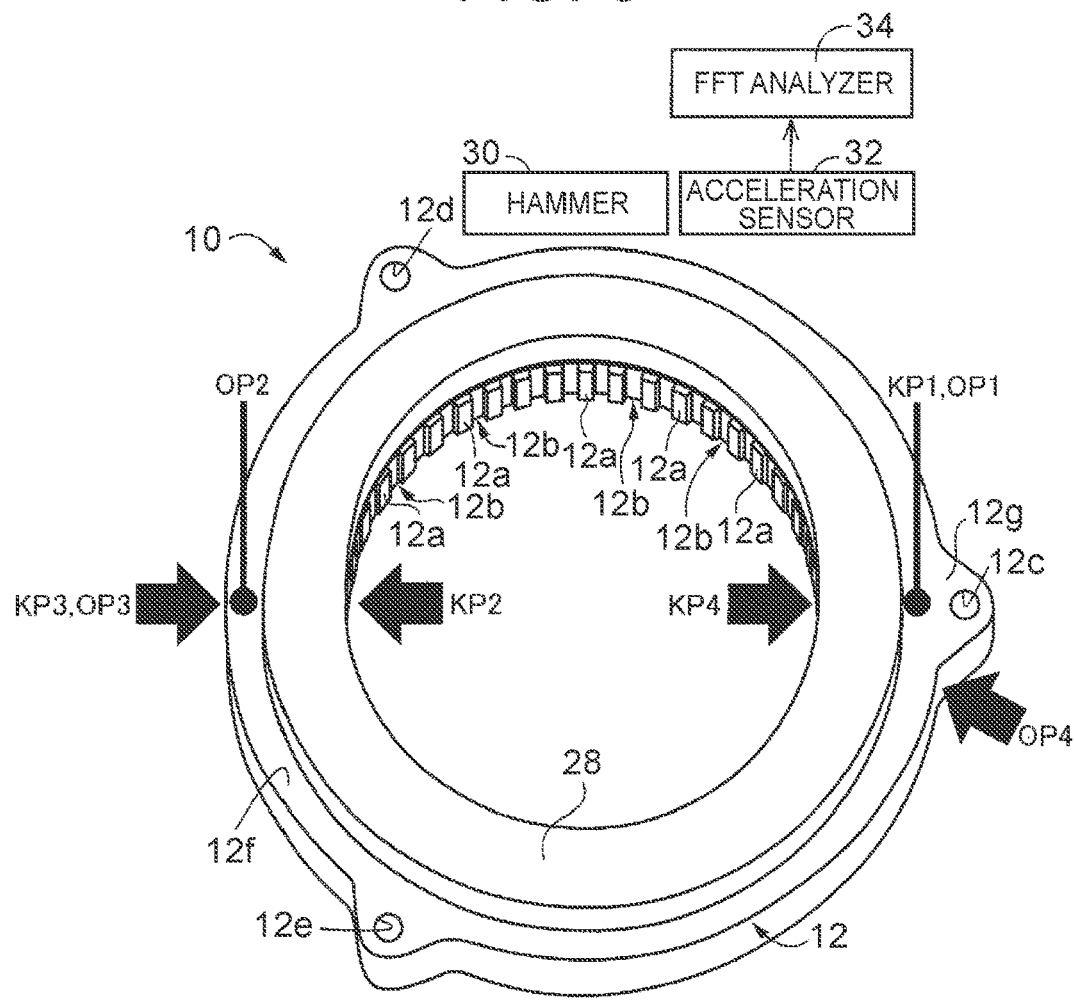
FIG. 5 is a diagram describing a natural frequency measurement step in FIG. 4.

The natural frequency measurement step P1 is a step of measuring the natural frequency NF [Hz] of the stator 10 in which the tooth portion 12a of the stator core 12 and the stator coil 14 are fixed by the insulating paper 20, that is, the stator 10 shown in FIG. 5. In the stator 10 shown in FIG. 5, the coil ends, that is, the tip end portions 22c of the plurality of coil segments 22 protruding from the slots 12b, which is the stator coil 14 protruding from the slots 12b, is integrally covered with a resin 28.

Figure 6:
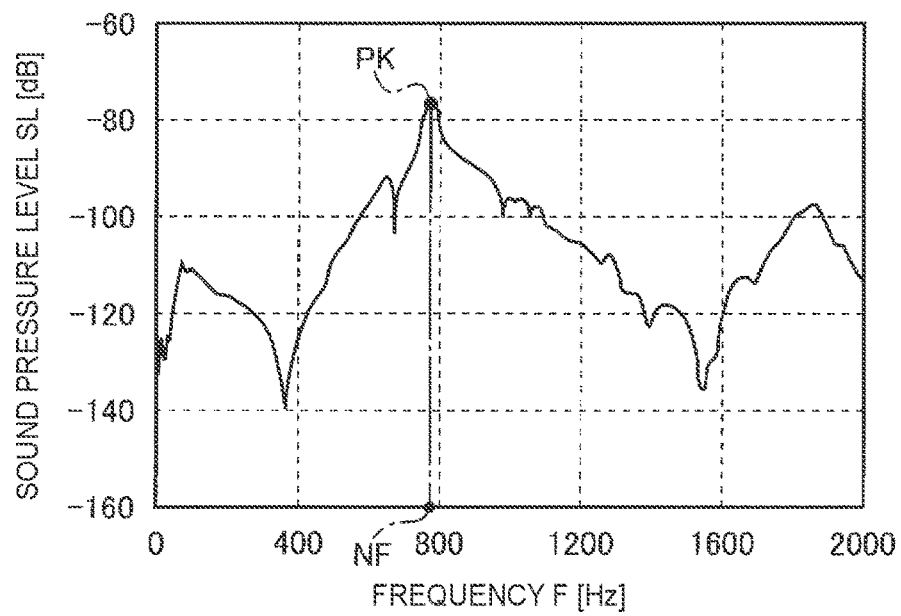
FIG. 6 is a diagram showing an example of an analysis result displayed on a display unit of an FFT analyzer in a natural frequency measurement step.

In the natural frequency measurement step P1, as shown in FIG. 5, frequency analysis is performed by an FFT analyzer 34 on a signal that is detected by an acceleration sensor (sensor) 32 provided at a predetermined second spot PL2 of the stator 10 by exciting a predetermined first spot PL1 of the stator 10 with the hammer 30, and, among the analysis result displayed on a display unit of the FFT analyzer 34, a frequency F [Hz] in which a sound pressure level SL [dB] establishes a highest peak is set as the natural frequency NF [Hz] of the stator 10. In the natural frequency measurement step P1, for example, the first spot PL1 is directly hit by the hammer 30 such as a metal hammer, a wooden hammer, or the like to excite the first spot PL1. Further, FIG. 6 is a diagram showing an example of the analysis result displayed on the display unit of the FFT analyzer 34. As shown in FIG. 6, the signal detected by the acceleration sensor 32 is frequency-analyzed by the FFT analyzer 34 and is displayed in two-dimensional coordinates consisting of a vertical axis indicating the sound pressure level SL [dB] and a horizontal axis indicating the frequency F [Hz]. In the analysis result displayed in FIG. 6, a point PK is the peak having the highest sound pressure level SL, and in the natural frequency measurement step P1, the frequency F of the point PK is set to the natural frequency NF of the stator 10. Further, the FFT analyzer 34 is a measuring instrument that frequency-analyzes the signal detected from the acceleration sensor 32 by a fast fourier transform (FFT) and that displays the analysis result on the display unit. In the present embodiment, for example, an FFT analyzer manufactured by ONOSOKKI is used as the FFT analyzer 34. In the natural frequency measurement step P1, for example, the stator 10 is excited by the hammer 30 in a state in which an area directly below fastening bolts (not shown) inserted into each of three insertion holes 12c, 12d, 12e formed in the stator core 12 is restrained by a table via a spring (not shown). The spring is, for example, a spring having a spring constant of about 2 N/mm.

Further, in the present embodiment, in the natural frequency measurement step P1, as shown in FIG. 5, the first spot PL1 is set to the predetermined first excitation spot KP1 of the stator 10, and the second spot PL2 is set to a predetermined first response spot OP1 of the stator 10. As shown in FIG. 5, the first excitation spot KP1 and the first response spot OP1 are each peripheral portions of the insertion hole 12c in an end surface 12f of the stator core 12 on the resin 28 side. Further, in the natural frequency measurement step P1, optimum spots of the first spot PL1 and the second spot PL2 were examined so that a measurer can accurately measure the natural frequency NF from the analysis result displayed on the display unit of the FFT analyzer 34, that is, so that the point PK or peak displayed on the display unit is output high and clearly. That is, as shown in FIG. 5, the first spot PL1 is changed to each of the first to fourth excitation spots KP1 to KP4, the second spot PL2 is changed to each of the first to fourth response spots OP1 to OP4, a total of 16 types of natural frequency measurement steps P1 were actually performed, and a total of 16 types of computer aided engineering (CAE) analysis were performed. From the actual measurement result of the natural frequency measurement step P1 and the analysis result by CAE analysis, when the first spot PL1 is the first excitation spot KP1 and the second spot PL2 is the first response spot OP1, the point PK, that is, the peak was output the highest and most clear. As shown in FIG. 5, the second excitation spot KP2 is the inner peripheral surface of the stator core 12 in an intermediate portion between the insertion hole 12d and the insertion hole 12e. Further, the third excitation spot KP3 is an outer peripheral surface of the stator core 12 in an intermediate portion between the insertion hole 12d and the insertion hole 12e. The fourth excitation spot KP4 is the inner peripheral surface of the stator core 12 on which an ear portion 12g is formed. In the ear portion 12g, a part of the outer circumference of the cylindrical stator core 12 protrudes outward, and the insertion hole 12c is formed in the ear portion 12g. The second response spot OP2 is the end surface 12f of the stator core 12 in the intermediate portion between the insertion hole 12d and the insertion hole 12e. The third response spot OP3 is the outer peripheral surface of the stator core 12 in the intermediate portion between the insertion hole 12d and the insertion hole 12e. Further, the fourth response spot OP4 is a boundary between the cylindrical stator core 12 and the ear portion 12g. The second excitation spot KP2, the third excitation spot KP3, the fourth excitation spot KP4, the third response spot OP3, and the fourth response spot OP4 are each disposed in the intermediate position of the stator core 12 in the rotation axis C direction.

Figure 7:
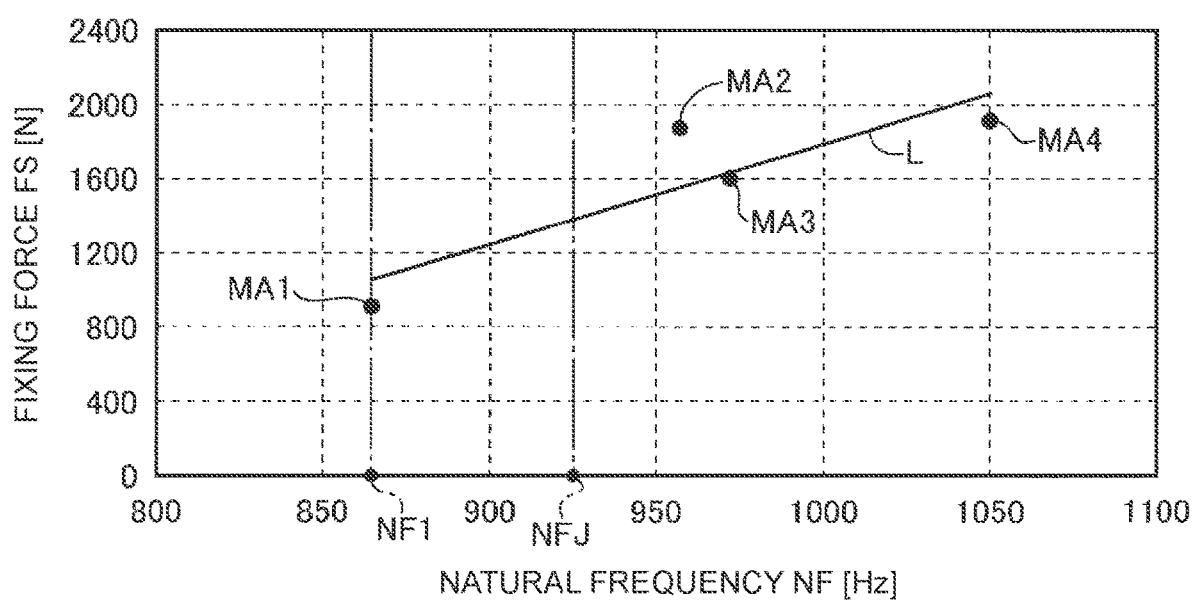

The fixing force evaluation step P2 is a step of evaluating that the fixing force FS of the insulating paper 20 is larger, when the natural frequency NF of the stator 10 measured in the natural frequency measurement step P1 is equal to more than a predetermined determination frequency NFJ [Hz], compared to when the natural frequency NF is lower than the determination frequency NFJ. That is, the fixing force evaluation step P2 is a step of estimating that the fixing force FS of the insulating paper 20 satisfies a reference value FST [N], when the natural frequency NF measured in the natural frequency measurement step P1 is equal to or more than the determination frequency NFJ. The reference value FST is, for example, a minimum fixing force FS required for the insulating paper 20 that is predetermined when the stator 10 is designed, and when the fixing force FS of the insulating paper 20 satisfies the reference value FST, this means that the fixing force FS of the insulating paper 20 is equal to more than the reference value FST. Further, the determination frequency NFJ is the natural frequency NF predetermined so that the reference value FST is sufficiently satisfied by using FIG. 7 previously determined by experiments or the like. FIG. 7 is a diagram showing a relationship between the fixing force FS of the insulating paper 20 and the natural frequency NF of the stator 10. In FIG. 7, for example, a plurality of (in the present embodiment, four) stators 10 having different fixing force FS of the insulating paper 20 were manufactured using the insulating paper 20 in which the thickness t of the foam adhesive layer 26 before heating, the material of the foam adhesive layer 26, and the like are changed, and the natural frequency NF of the stator 10 and the fixing force FS of the insulating paper 20 were measured, respectively. As shown in FIG. 7, for example, the determination frequency NFJ is set to the natural frequency (NF1× SF) in which the natural frequency NF1 of a first measurement point MA1 having the lowest fixing force FS among the four first to fourth measurement points MA1 to MA4 is multiplied by a predetermined safety factor SF so as to sufficiently satisfy the reference value FST. The fixing force FS of the insulating paper 20 at the first to the fourth measurement points MA1 to MA4 shown in FIG. 7 are measured by cutting the stator 10 in a direction orthogonal to the rotation axis C and pressing the stator coil 14 exposed on a cutting surface, that is, each of the coil segments 22, with a gauge until the tooth portions 12a of the stator core 12 come off. Further, the natural frequency NF of the stator 10 of the first to the fourth measurement points MA1 to MA4 shown in FIG. 7 is measured by the same method as the above-mentioned natural frequency measurement step P1. In the natural frequency NF of the first to fourth measurement points MA1 to MA4, the first spot PL1 is the first excitation spot KP1 and the second spot PL2 is the first response spot OP1. A solid line L shown in FIG. 7 is a line showing the tendency of the fixing force FS and the natural frequency NF at the first to fourth measurement points MA1 to MA4. In FIG. 7, when the fixing force FS of the insulating paper 20 changes, the natural frequency NF of the stator 10 also changes, and as shown by the solid line L in FIG. 7, the larger the fixing force FS of the insulating paper 20, the higher the natural frequency NF of the stator 10 tends to be. Since the fixing force FS of the insulating paper 20 and the hardness of the cured foam adhesive layer 26 correlate with each other, and the harder the cured foam adhesive layer 26 is, the greater the fixing force FS of the insulating paper 20 is, the harder the foam adhesive layer 26 is, the higher the natural frequency NF of the stator 10 measured in the natural frequency measurement step P1 is.

As described above, the fixing force evaluation method of the present embodiment includes the natural frequency measurement step P1 of measuring the natural frequency NF of the stator 10 in which the tooth portions 12a and the stator coil 14 are fixed by the insulating paper 20, and the fixing force evaluation step P2 of evaluating that the fixing force FS of the insulating paper 20 is larger, when the natural frequency NF of the stator 10 measured in the natural frequency measurement step P1 is equal to more than a predetermined determination frequency NFJ, compared to when the natural frequency NF is lower than the determination frequency NFJ. Thus, since the fixing force FS of the insulating paper 20 is evaluated in the fixing force evaluation step P2 based on the natural frequency NF of the stator 10 measured in the natural frequency measurement step P1, the fixing force FS of the insulating paper 20 can be evaluated by measuring the natural frequency NF of the stator 10 without destroying the stator 10.

According to the fixing force evaluation method of the present embodiment, in the fixing force evaluation step P2, it is estimated that the fixing force FS of the insulating paper 20 satisfies a reference value FST, when the natural frequency NF measured in the natural frequency measurement step P1 is equal to or more than the determination frequency NFJ. Therefore, it is possible to estimate whether the fixing force FS of the insulating paper 20 satisfies the reference value FST by measuring the natural frequency NF of the stator 10 without destroying the stator 10.

According to the fixing force evaluation method of the present embodiment, in the natural frequency measurement step P1, frequency analysis is performed on a signal that is detected by an acceleration sensor 32 provided at a predetermined second spot PL2 of the stator 10 by exciting the predetermined first spot PL1 of the stator 10 with the hammer 30, and the frequency F in which the sound pressure level SL establishes the highest peak is set as the natural frequency NF of the stator 10. Thus, the natural frequency NF of the stator 10 can be suitably measured in the natural frequency measurement step P1.

Further, according to the fixing force evaluation method of the present embodiment, the foam adhesive layer 26 expands by being heated and then hardens, and the harder the hardness of the cured foam adhesive layer 26 is, the higher the natural frequency NF measured in the natural frequency measurement step P1 is. Thus, the hardness of the cured foam adhesive layer 26 can be evaluated by measuring the natural frequency NF of the stator 10 without destroying the stator 10.

Although the embodiments of the present disclosure have been described in detail with reference to the drawings, the present disclosure is also applicable to other modes.

For example, in the above-described first embodiment, the stator core 12 is formed by stacking a plurality of electromagnetic steel plates. However, the stator core 12 does not necessarily have to be formed by a plurality of electromagnetic steel plates. For example, the stator core 12 may be formed by molding a magnetic powder, a solid, or the like.

Further, in the above-described first embodiment, the vehicle rotary electric machine MG is a motor generator that is a drive source for traveling of a vehicle. However, an applicable embodiment of the present disclosure is not limited to this aspect. For example, the vehicle rotary electric machine MG may be a vehicle drive electric motor having only an electric motor function without having a generator function. Further, the vehicle rotary electric machine MG may be a regenerative generator having only a generator function without having an electric motor function.

Further, in the above-mentioned first embodiment, the foam adhesive layer 26 of the insulating paper 20 is a thermosetting resin layer in which the resin beads containing a foaming agent were contained in an epoxy type thermosetting resin. However, the foam adhesive layer 26 may be, for example, a layer of a thermosetting resin in which the resin beads are contained in a thermosetting resin other than the epoxy type. Further, although polyethylene naphthalate (PEN) is used as the resin material of the base material 24 of the insulating paper 20, a resin material such as polyphenylene sulfide (PPS) or epoxy resin may be used.

Further, in the natural frequency measurement step P1 of the first embodiment described above, the natural frequency NF of the stator 10 is measured by exciting the stator 10 with the hammer 30 and performing frequency analysis on the signal detected from the acceleration sensor 32 with the FFT analyzer 34. For example, instead of the hammer 30, a jig may be attached to the first spot PL1 of the stator 10 and a weight at a tip of a pendulum may be collided with the jig to excite the first spot PL1.

The above description is merely an example, and the present disclosure can be implemented in various modified and improved modes based on the knowledge of those skilled in the art.

What is claimed is:

1. A fixing force evaluation method for evaluating a fixing force of an insulating paper that has a foam adhesive layer on both sides, the insulating paper being interposed between a tooth portion provided on a stator core included in a stator and a coil wound around the tooth portion, the stator core including insertion holes formed in an end surface of the stator core, and the insulating paper fixing the tooth portion and the coil, the fixing force evaluation method comprising:

inserting fastening bolts into the insertion holes of the stator core to restrain an area directly below the fastening bolts by a table via a spring;

measuring a natural frequency of the stator in which the tooth portion and the coil are fixed by the insulating paper while the stator core is restrained by the table;

performing frequency analysis by using a fast fourier transform on a signal that is detected by an acceleration sensor provided at a predetermined second spot of the stator when the natural frequency is measured; and evaluating that the fixing force of the insulating paper is large when the measured natural frequency of the stator is high, compared to when the natural frequency is low, the fixing force being evaluated as being high in a case where the natural frequency exceeds a threshold natural frequency, wherein the frequency analysis is performed by exciting a predetermined first spot of the stator with a hammer, and a frequency in which a sound pressure level establishes the highest peak is set as the natural frequency of the stator, and the predetermined first spot of the stator and the predetermined second spot of the stator are each peripheral portions of the insertion holes.

2. The fixing force evaluation method according to claim 1, wherein the fixing force of the insulating paper satisfies a predetermined reference value is estimated when the fixing force is evaluated and the measured natural frequency is equal to or more than a predetermined determination frequency.

3. The fixing force evaluation method according to claim 1, wherein the foam adhesive layer is a layer of a thermosetting resin in which resin beads containing a foaming agent are contained.

* * * * *